(12) United States Patent
Bader et al.

(10) Patent No.: US 8,537,163 B2
(45) Date of Patent: Sep. 17, 2013

(54) METHOD FOR DISPLAYING CONTINUOUS LINES

(75) Inventors: Joachim Bader, Butzbach (DE); Sven Marco Hoppe, Oberursel (DE)

(73) Assignee: Diehl Aerospace GmbH, Ueberlingen/Brd (DE)

( * ) Notice: Subject to any disclaimer, the term of this patent is extended or adjusted under 35 U.S.C. 154(b) by 665 days.

(21) Appl. No.: 12/615,390

(22) Filed: Nov. 10, 2009

(65) Prior Publication Data
US 2010/0123720 A1 May 20, 2010

(30) Foreign Application Priority Data
Nov. 15, 2008 (DE) .................. 10 2008 057 512

(51) Int. Cl.
*G06T 11/20* (2006.01)
(52) U.S. Cl.
USPC .......................................... 345/443; 345/442
(58) Field of Classification Search
USPC .................................. 345/443; 382/204, 258
See application file for complete search history.

(56) References Cited

U.S. PATENT DOCUMENTS

| | | | |
|---|---|---|---|
| 4,620,287 A | | 10/1986 | Yam |
| 4,901,251 A | * | 2/1990 | Sfarti ............................ 345/441 |
| 5,095,520 A | * | 3/1992 | Kim ............................... 358/1.1 |
| 5,208,904 A | * | 5/1993 | Sasaki ........................... 345/443 |
| 5,293,472 A | * | 3/1994 | Lotspiech ..................... 345/443 |
| 5,611,036 A | * | 3/1997 | Berend et al. ................ 345/441 |
| 5,613,053 A | * | 3/1997 | Albers et al. ................. 345/443 |

(Continued)

FOREIGN PATENT DOCUMENTS
EP 2 107 528 A1 10/2009
WO WO 84/02993 8/1984

OTHER PUBLICATIONS

Barequet et al., Filling gaps in the boundary of a polyhedron, Computer Aided Geometric Design, vol. 12, issue 2, Mar. 1995, pp. 207-229.*
Anonymous, "Line Joins", Feb. 25, 2008, pp. 1-2.

(Continued)

*Primary Examiner* — M Good Johnson
(74) *Attorney, Agent, or Firm* — Scully, Scott, Murphy & Presser PC

(57) ABSTRACT

A method for displaying continuous lines on a raster-based display appliance, with a continuous line being defined by a sequence of two-dimensional support points v1 and v2 and a line width w, and with a rectangle 1, which connects the support points v1, v2, having a rectangle length predetermined by the distance between the support points v1, v2 and having a rectangle width predetermined by the line width w being displayed between two support points v1, v2. The method provides that a triangle sequence 6, which covers a gap 5 between the rectangles 1, 2, is displayed between two successive rectangles 1 and 2 whose alignment with respect to one another is at an angle $\alpha \geq \alpha_0$. The triangle sequence 6 includes a plurality of triangles which each have the support point v2, which connects the successive rectangles 1, 2, as a common corner point. A connecting triangle 7 is in each case displayed between the rectangle 1 and the triangle sequence 6 and between the triangle sequence 6 and the subsequent rectangle 2, the corner points of which connecting triangle 7 are the two corner points, which face the triangle sequence 6, of the rectangle 1, and of the subsequent rectangle 2 and the connecting support point v2. The corner points of the triangle sequence 6 are predetermined as a function of the angle $\alpha$ between the alignment of the successive rectangles 1, 2.

11 Claims, 4 Drawing Sheets

(56) References Cited

U.S. PATENT DOCUMENTS

| | | | |
|---|---|---|---|
| 5,644,691 A * | 7/1997 | Dyches et al. | 345/441 |
| 5,959,635 A * | 9/1999 | Watanabe et al. | 345/469 |
| 6,707,452 B1 | 3/2004 | Veach | |
| 6,897,869 B1 * | 5/2005 | Bednar et al. | 345/441 |
| 6,909,430 B2 * | 6/2005 | Dresevic et al. | 345/443 |
| 7,439,980 B2 * | 10/2008 | Honme | 345/530 |
| 7,791,617 B2 * | 9/2010 | Crow et al. | 345/611 |
| 7,817,152 B2 * | 10/2010 | Kokojima | 345/470 |
| 2001/0055024 A1 * | 12/2001 | Funakubo et al. | 345/589 |
| 2003/0038813 A1 * | 2/2003 | Lu | 345/582 |
| 2004/0263516 A1 | 12/2004 | Michail et al. | |
| 2006/0022977 A1 | 2/2006 | Bronder | |
| 2006/0044312 A1 * | 3/2006 | Loop | 345/443 |
| 2007/0139440 A1 * | 6/2007 | Crow et al. | 345/614 |
| 2007/0222784 A1 * | 9/2007 | Arneau et al. | 345/441 |
| 2007/0229454 A1 | 10/2007 | Yamauchi | |

OTHER PUBLICATIONS

Glen E. Gardner, "Rendering Two-Dimensional Primitives using OpenGL", May 30, 2003, pp. 1-12.

Haeberli, et al, "Texture Mapping as a Fundamental Drawing Primitive", Jun. 1, 1993, pp. 259-266.

\* cited by examiner

METHOD FOR DISPLAYING CONTINUOUS LINES

BACKGROUND OF THE INVENTION

1. Field of the Invention

The invention relates to a method for displaying continuous lines on a raster-based display appliance, with a continuous line being defined by a sequence of two-dimensional support points and a line width, and with a rectangle, which connects each of the support points, having a rectangle length predetermined by the distance between the support points and having a rectangle width predetermined by the line width being displayed between two support points.

Raster-based display appliances are used, for example, in vehicles or aircraft, and are used to display information which is important for operation and/or control of the vehicle or the aircraft. The respectively displayed information is intended to be displayed as clearly as possible, as well as quickly and in an unambiguously identifiable manner, on the display appliances that are used, normally screens or flat displays. At the same time, undesirable changes during the display of the information, such as line thicknesses which vary as a function of orientation or position or continuous lines which are interpolated uncleanly are intended to be avoided, since they could disadvantageously distract the viewer.

2. Discussion of the Prior Art

In order to allow graphics displays to be produced and displayed in particular in aircraft which are intended to comply with stringent quality demands because of safety-relevant requirements, programming languages and hardware components matched thereto have been developed, which are distinguished by simple but reliable reproduction, as naturally as possible, of visually displayed information. While the software, such as the "Standard Graphics Language" (SGL) is being developed further all the time, the development of new hardware components is extraordinarily costly, particularly for civil and military aviation.

In order to make it possible to avoid the development of hardware components with ever greater performance, which are optimized for displaying such information, methods for displaying graphics information are being developed, and/or optimized, which do not require any hardware components matched thereto and, for example, can also be used in conjunction with commercially available graphics cards, graphics processors or graphics display appliances and at the same time allow and ensure high-quality graphics display.

It is known from practice that a continuous line which is defined by a sequence of two-dimensional support points and by a predetermined line width can be represented by a sequence of rectangles which connect respectively adjacent support points to one another and whose widths correspond to the predetermined line width. If the standardized graphics programming language OpenGL is used, then the rectangles are each preferably displayed as two triangles with a common base line, since, in this graphics programming language, triangles and triangle sequences can be produced and displayed particularly quickly.

However, rectangle sequences such as these are subject to a problem with regard to the area between two successive rectangles, if the mutual alignment of the two successive rectangles differs noticeably, and is at an angle $\alpha$. In this case, the two successive rectangles partially overlap while a visible gap remains on the side opposite the overlap area, which gap is not covered by either of the two successive rectangles.

A continuous line composed of a plurality of rectangles is then no longer perceived as a uniform continuous line displayed naturally, but rather as a discontinuous line, for example as a sequence of individual line segments, which do not appear to be continuously connected.

By way of example, US 2007/0 222 784 A1 has disclosed the possibility of covering or filling the resulting gaps between the rectangles with circular segments in order to give the continuous line a more natural appearance. In this case, a check is carried out for all the pixels which could fall in the area of the circular segment to determine whether and if appropriate with what intensity the relevant pixels should be displayed. A method such as this is highly computation intensive and, in particular, is unsuitable for displaying numerous continuous lines with a line width comprising a plurality of pixels.

SUMMARY OF THE INVENTION

In consequence, the object of the present invention is considered to be the development of a method of the generic type mentioned initially for displaying continuous lines, which allows a high-quality display of continuous lines, with a finite line width, with as little computation complexity and time involved as possible.

According to the invention, this object is achieved in that a triangle sequence, which covers a gap between the rectangles, is displayed between two successive rectangles whose alignment with respect to one another is at an angle $\alpha \geq \alpha_0$. A triangle sequence can be displayed very quickly, particularly when using the graphics programming language OpenGL. All that is necessary is to determine the respective corner points which bound the triangle sequence. The association and checking of individual pixels within possibly relevant areas between successive rectangles are unnecessary.

It is preferable for the triangle sequence to comprise a plurality of triangles which each have the support point, which connects the successive rectangles, as a common corner point. Since the two successive rectangles touch at the connecting support point, the two successive rectangles overlap in a first area adjacent to the support point, while a gap opens between the successive rectangles in a second, opposite, area, on another side of the support point. The greater the extent to which the respective alignments of the rectangles differ from one another, the larger is the gap between these rectangles. It has been found that the use of a single triangle to fill the gap, whose corner points have not only the support point connecting the successive rectangles but also the respectively associated corner points of the successive rectangles, is not perceived as a visually perceptible connection between the rectangles, in particular when the discrepancies between the respective alignments of the rectangles is relatively large. For this reason, it appears to be expedient for the triangle sequence to comprise a plurality of triangles, and for the external triangle edges to approximate as closely as possible to a circular arc segment.

It has been found that, in many cases that occur in practice, it can be considered adequate for the triangle sequence to have three triangles. Since the line width of many objects covers only a few pixels of the raster-based display appliance, just a correspondingly small number of pixels may be located in the gap between the two successive rectangles. In most cases, a triangle sequence of three triangles will then actually fill this gap approximately in the same way as a circular segment, in such a way that no noticeable difference can be perceived by the human eye. The triangle sequence may, of course, also have more than three triangles, thus making it possible to improve the visual quality of the display in specific cases.

In order to allow the continuous line to be displayed as quickly as possible, the invention provides that a connecting triangle is in each case displayed between the rectangle and the triangle sequence and between the triangle sequence and the subsequent rectangle, the corner points of which connecting triangle are the two corner points, which face the triangle sequence, of the rectangle, and of the subsequent rectangle and the connecting support point. Particularly when using the graphics programming language OpenGL, triangles can be represented and displayed particularly easily and quickly. The successive rectangles are also normally displayed as a sequence of two triangles. Since neither the rectangles nor the triangles which fill these rectangles have a corner point which is used together with the connecting support point, it is advantageous to provide a connecting triangle for the respective connection to the triangle sequence arranged between the rectangles, the base length of which connecting triangle coincides with an end edge, facing the triangle sequence, of the rectangle, or of the subsequent rectangle, and whose remaining corner point is the connecting support point located centrally on its base length. This results in the edge length being halved while the connecting triangle is being displayed, as a result of which the triangle sequence which is required to close the gap can then be connected directly thereto in order, subsequently, to once again match the edge length to the line width, or the rectangle width of the subsequent rectangle, by means of a further connecting triangle, and to allow this rectangle to be displayed by two further triangles.

This allows a complete continuous line, including the polygons which fill the gaps between individual successive line segments or rectangles, to be produced and imaged by means of a continuous triangle sequence. A triangle sequence such as this can easily be calculated in advance, and can be displayed very quickly.

The invention preferably provides that the corner points of the triangle sequence are predetermined as a function of the angle $\alpha$ between the alignment of the successive rectangles. It has been found that, for comparatively small angles where $\alpha \leqq 20°$, any gap remaining between the successive rectangles is scarcely perceived. This gap can be avoided or covered in a simple manner by in each case drawing polygons instead of the two adjacent rectangles, the common polygon edge of which polygons lies along the angle bisector of the rectangle edges which bound the gap.

Furthermore, the corner points of the triangle sequence can be calculated, for example for particularly large direction changes, to be precise angles $\alpha \geqq 160°$, in a simple approximate manner, in contrast to the remaining angle range $20° \leqq \alpha \leqq 160°$, in order to make it possible to avoid unnecessary computation complexity by simplifying approximations for extremely acute angles.

In order to allow a visually appealing display of the continuous line, the invention provides for the triangle sequence to be filled with shading. The shading used for the triangle sequence in the respective transitional areas between the adjacent rectangles is intended to have a shading transitional area matched to the shading of the rectangles.

The invention preferably provides for the shading to be a subarea of end point shading. In most cases, end point shading is a semicircular, radially symmetrical shading, which is matched to the line width of the continuous line and to its shading. The use of a suitable subarea of end point shading makes it possible to ensure a smooth transition from the shading of the triangle sequence to the subsequent shadings of the rectangle adjacent thereto.

The invention advantageously provides that the shading is a circular segment of radially symmetrical end point shading.

The circular segment expediently has a circular segment angle which corresponds to the angle $\alpha$ between the alignment of the successive rectangles. This avoids complex conversion between two geometric areas which differ considerably from one another.

BRIEF DESCRIPTION OF THE DRAWINGS

One exemplary embodiment of the invention will be explained in more detail in the following text, and is illustrated in the drawing, in which.

DETAILED DESCRIPTION OF THE INVENTION

It is known that a continuous line can be defined by a plurality of successive support points v1, v2 etc., and by a predetermined line width w. In order to display the continuous line on a display apparatus, for example on a display, it is expedient to display the continuous line by a sequence of rectangles connecting the respectively adjacent support points, with each rectangle in turn being composed of two triangles. In many graphics programming languages such as OpenGL, triangle sequences such as these can be produced and displayed particularly easily and quickly.

Figure 1:
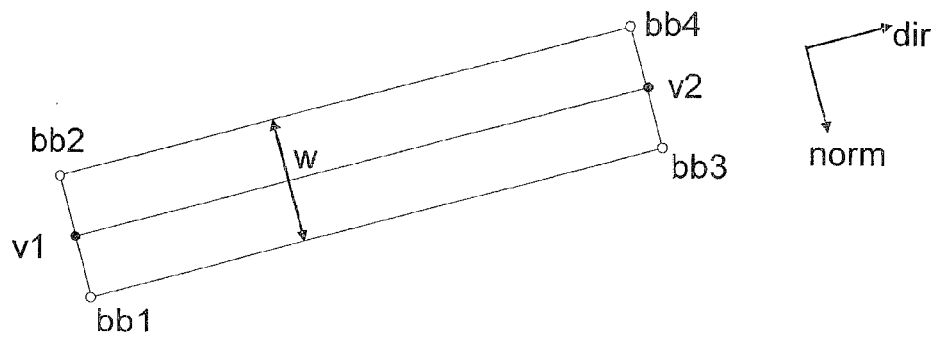
FIG. 1 shows a schematic illustration of a rectangle connecting two support points.
Figure 2:
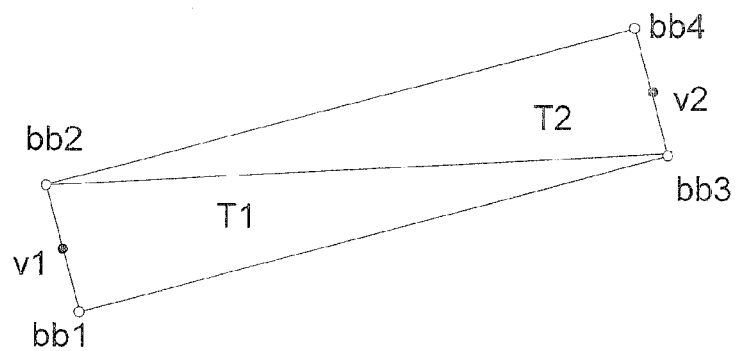
FIG. 2 shows a schematic illustration of two triangles for displaying the rectangle illustrated in FIG. 1.
Figure 3:
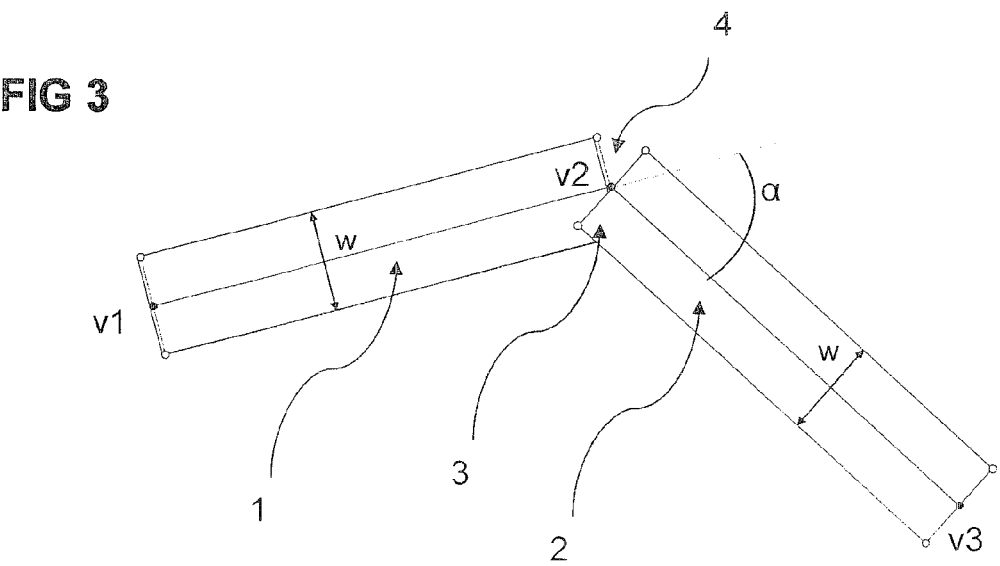
FIG. 3 shows a schematic illustration of two successive rectangles which are aligned at an angle $\alpha$ relative to one another.

As can be seen from FIGS. 1 and 2, a normalized direction vector "dir" with the two components:

$$dir.x = \frac{(v1.x - v2.x)}{\sqrt{(v1.x - v2.x)^2 + (v1.y - v2.y)^2}} \quad (1)$$

$$dir.y = \frac{(v1.y - v2.y)}{\sqrt{(v1.x - v2.x)^2 + (v1.y - v2.y)^2}} \quad (2)$$

and a normalized normal vector "norm" directed at right angles to the direction vector and having the components $$norm.x = dir.y \quad (3)$$

$$norm.y = -dir.x \quad (4)$$

can be calculated for two successive support points v1 and v2 with the two-dimensional coordinates v1 and v2. On the basis of the vectors "dir" and "norm" calculated in this way, the two-dimensional corner points bb1, bb2, bb3 and bb4 of a rectangle 1 connecting the two support points v1 and v2 can be calculated using the equations shown below:

$$bb1.x = v1.x + \left(norm.x * \frac{w}{2}\right) \quad (5)$$

$$bb1.y = v1.y + \left(norm.y * \frac{w}{2}\right) \quad (6)$$

$$bb2.x = v1.x - \left(norm.x * \frac{w}{2}\right) \quad (7)$$

$$bb2.y = v1.y - \left(norm.y * \frac{w}{2}\right) \quad (8)$$

$$bb3.x = v2.x + \left(norm.x * \frac{w}{2}\right) \quad (9)$$

$$bb3.y = v2.x - \left(norm.x * \frac{w}{2}\right) \quad (10)$$

$$bb4.x = v2.x - \left(norm.x * \frac{w}{2}\right) \quad (11)$$

$$bb4.y = v2.y - \left(norm.y * \frac{w}{2}\right) \quad (12)$$

This rectangle 1 can be filled and displayed by means of two triangles T1 and T2. Using the graphics programming language OpenGL, this triangle sequence could be displayed using the command:

```
glBegin(GL_TRIANGLE_STRIP);
   glVertex2fv(&bb1);
   glVertex2fv(&bb2);
   glVertex2fv(&bb3);
   glVertex2fv(&bb4);
glEnd( );
```

When two successive rectangles 1, 2 with the respective previously calculated corner points are displayed, then the two rectangles 1, 2 are superimposed in an area 3 alongside the support point v2 connecting the successive rectangles 1, 2. A visible gap 5, which is displayed without being filled, remains in an opposite area 4 alongside the support point v2. According to the invention, this gap 5 is displayed covered and filled by a triangle sequence 6 determined in some suitable manner.

First of all, a normalized angle bisector "bisec" is calculated between the normal vector "$norm_n$" of the first rectangle 1 and the normal vector "$norm_{n+1}$" of the subsequent second rectangle 2, with the parameters or characteristic variables defined below:

$$bisector.x = norm.x_n + norm.x_{n+1} \quad (13)$$

$$bisector.y = norm.y_n + norm.y_{n+1} \quad (14)$$

$$bisec.x = \frac{bisector.x}{\sqrt{bisector.x^2 + bisector.y^2}} \quad (15)$$

$$bisec.y = \frac{bisector.y}{\sqrt{bisector.x^2 + bisector.y^2}} \quad (16)$$

-continued $$bisec.\cos = norm.x_n * bisec.x + norm.y_n * bisec.y \quad (17)$$

$$cosine = norm.x_n * norm.x_{n+1} + norm.y_n * norm.y_{n+1} \quad (18)$$

$$sine = dir.x_n * norm.x_{n+1} + dir.y_n * norm.y_{n+1} \quad (19)$$

Figure 4:
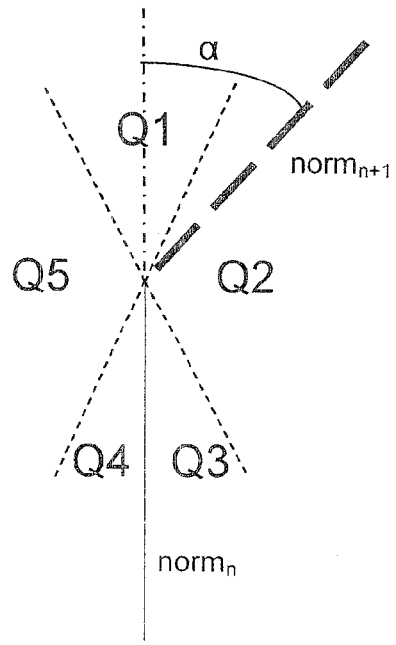
FIG. 4 shows a schematic illustration of a qualitative association of the angle $\alpha$ with different quadrants.

In order to speed up the calculation and display of the continuous line, the rest of the procedure is different, on the basis of an angle α between the normalized direction vector "$dir_n$" of the first rectangle 1 and the normalized direction vector "$dir_{n+1}$" of the second rectangle 2. For this purpose, the angle α is associated with one of the five quadrants Q1 to Q5 as shown in FIG. 4, and the sequence of steps in the rest of the procedure for filling and displaying the gap 5 between the successive rectangles 1 and 2 is chosen as a function of this association.

Figure 5:
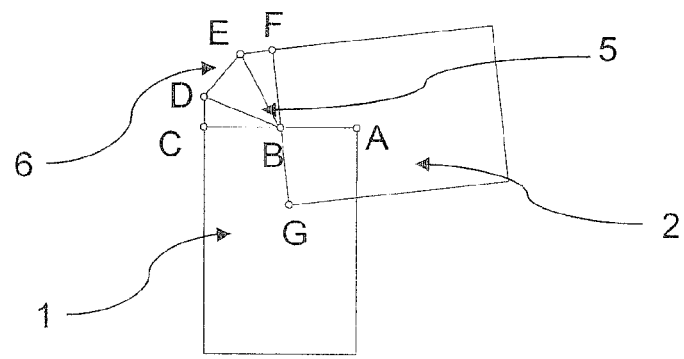
FIG. 5 shows a schematic illustration of a triangle sequence which covers a gap between two rectangles whose relative alignment changes to the right.

If the continuous line has a profile that bends to the right (FIG. 5) with an angle α within the quadrant Q2, the gap 5 is filled with a triangle sequence 6 comprising three triangles, with the respective corner points BCD, BDE and BEF. The two-dimensional coordinates of the corner points A to G shown by way of example in FIG. 5 for the successive rectangles 1 and 2 are calculated using:

$$bb.x_A = v.x_{n+1} - \left(norm.x_n * \frac{w}{2}\right) \quad (20)$$

$$bb.y_A = v.y_{n+1} - \left(norm.y_n * \frac{w}{2}\right) \quad (21)$$

$$bb.x_B = v.x_{n+1} \quad (22)$$

$$bb.y_B = v.y_{n+1} \quad (23)$$

$$bb.x_C = v.x_{n+1} - \left(norm.x_n * \frac{w}{2}\right) \quad (24)$$

$$bb.y_C = v.y_{n+1} - \left(norm.y_n * \frac{w}{2}\right) \quad (25)$$

$$bb.x_D = v.x_{n+1} - \left((norm.x_n + (1 - bisec.\cos) * -dir.x_n) * \frac{w}{2}\right) \quad (26)$$

$$bb.y_D = v.y_{n+1} - \left((norm.y_n + (1 - bisec.\cos) * -dir.y_n) * \frac{w}{2}\right) \quad (27)$$

$$bb.x_E = v.x_{n+1} - \Big((norm.x_{n+1} - (1 - bisec.\cos) * \\ -dir.x_{n+1}) * \frac{w}{2}\Big) \quad (28)$$

$$bb.y_E = v.y_{n+1} - \Big((norm.y_{n+1} - \\ (1 - bisec.\cos) * -dir.y_{n+1}) * \frac{w}{2}\Big) \quad (29)$$

$$bb.x_F = v.x_{n+1} - \left(norm.x_{n+1} * \frac{w}{2}\right) \quad (30)$$

$$bb.y_F = v.y_{n+1} - \left(norm.y_{n+1} * \frac{w}{2}\right) \quad (31)$$

$$bb.x_G = v.x_{n+1} + \left(norm.x_{n+1} * \frac{w}{2}\right) \quad (32)$$

$$bb.y_G = v.y_{n+1} + \left(norm.y_{n+1} * \frac{w}{2}\right) \quad (33)$$

Figure 6:
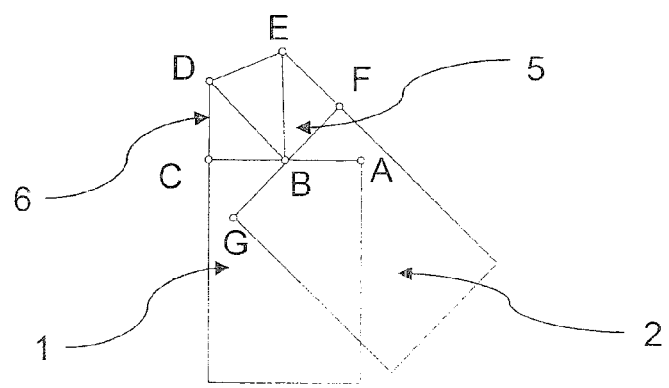
FIG. 6 shows a schematic illustration as shown in FIG. 5, with the alignment of the rectangles changing through virtually 180° to the right.

If the continuous line has a profile which bends sharply to the right (FIG. 6) with an angle α within the quadrant Q3, the gap 5 is likewise filled with a triangle sequence 6 comprising three triangles with the respective corner points BCD, BDE and BEF, with the two-dimensional coordinates of the relevant corner points A to F being calculated using:

$$bb.x_A = v.x_{n+1} - \left(norm.x_n * \frac{w}{2}\right) \quad (34)$$

$$bb.y_A = v.y_{n+1} - \left(norm.y_n * \frac{w}{2}\right) \quad (35)$$

$$bb.x_B = v.x_{n+1} \quad (36)$$

$$bb.y_B = v.y_{n+1} \quad (37)$$

$$bb.x_C = v.x_{n+1} + \left((norm.x_n + dir.x_n) * \frac{w}{2}\right) \quad (38)$$

$$bb.y_C = v.y_{n+1} + \left((norm.y_n + dir.y_n) * \frac{w}{2}\right) \quad (39)$$

$$bb.x_D = v.x_{n+1} + \left((norm.x_{n+1} - dir.x_{n+1}) * \frac{w}{2}\right) \quad (40)$$

$$bb.y_D = v.y_{n+1} + \left((norm.y_{n+1} - dir.y_{n+1}) * \frac{w}{2}\right) \quad (41)$$

$$bb.x_E = v.x_{n+1} + \left(norm.x_{n+1} * \frac{w}{2}\right) \quad (42)$$

$$bb.y_E = v.y_{n+1} + \left(norm.y_{n+1} * \frac{w}{2}\right) \quad (43)$$

$$bb.x_F = v.x_{n+1} - \left(norm.x_{n+1} * \frac{w}{2}\right) \quad (44)$$

$$bb.y_F = v.y_{n+1} - \left(norm.y_{n+1} * \frac{w}{2}\right) \quad (45)$$

Figure 7:
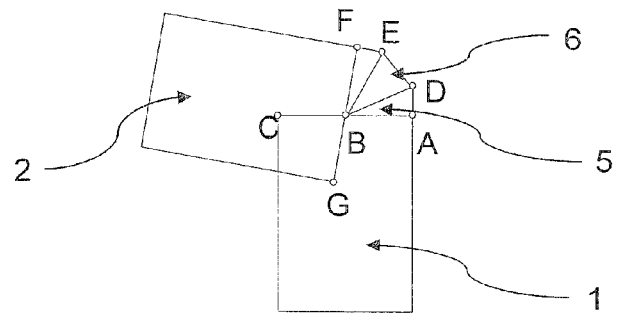
FIG. 7 shows a schematic illustration as shown in FIGS. 5 and 6, with the alignment of the rectangles changing to the left.
Figure 8:
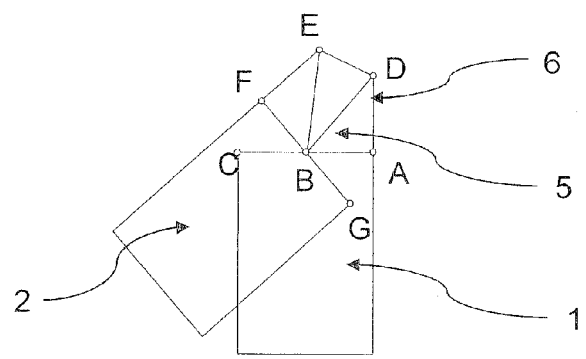
FIG. 8 shows a schematic illustration as shown in FIGS. 5 to 7, with the alignment of the rectangles changing through virtually 180° to the left.

In the same way, in the case of a profile which bends to the left (quadrant Q5) or bends sharply to the left (quadrant Q4), the coordinates of the relevant corner points for calculation and display of the triangle sequence filling the gap 5 are calculated using:

$$bb.x_A = v.x_{n+1} - \left(norm.x_n * \frac{w}{2}\right) \quad (46)$$

$$bb.y_A = v.y_{n+1} - \left(norm.y_n * \frac{w}{2}\right) \quad (47)$$

$$bb.x_B = v.x_{n+1} \quad (48)$$

$$bb.y_B = v.y_{n+1} \quad (49)$$

$$bb.x_C = v.x_{n+1} - \left(norm.x_n * \frac{w}{2}\right) \quad (50)$$

$$bb.y_C = v.y_{n+1} - \left(norm.y_n * \frac{w}{2}\right) \quad (51)$$

$$bb.x_D = v.x_{n+1} + \left((norm.x_n + (1 - bisec.\cos) * dir.x_n) * \frac{w}{2}\right) \quad (52)$$

$$bb.y_D = v.y_{n+1} + \left((norm.y_n + (1 - bisec.\cos) * dir.y_n) * \frac{w}{2}\right) \quad (53)$$

$$bb.x_E = v.x_{n+1} + \big((norm.x_{n+1} - \\ (1 - bisec.\cos) * dir.x_{n+1}) * \frac{w}{2}\big) \quad (54)$$

$$bb.y_E = v.y_{n+1} + \big((norm.y_{n+1} - \\ (1 - bisec.\cos) * dir.y_{n+1}) * \frac{w}{2}\big) \quad (55)$$

$$bb.x_F = v.x_{n+1} + \left(norm.x_{n+1} * \frac{w}{2}\right) \quad (56)$$

$$bb.y_F = v.y_{n+1} + \left(norm.y_{n+1} * \frac{w}{2}\right) \quad (57)$$

$$bb.x_G = v.x_{n+1} - \left(norm.x_{n+1} * \frac{w}{2}\right) \quad (58)$$

$$bb.y_G = v.y_{n+1} - \left(norm.y_{n+1} * \frac{w}{2}\right), \quad (59)$$

for an angle α within the quadrant Q5 (FIG. 7), or using $$bb.x_A = v.x_{n+1} - \left(norm.x_n * \frac{w}{2}\right) \quad (60)$$

$$bb.y_A = v.y_{n+1} - \left(norm.y_n * \frac{w}{2}\right) \quad (61)$$

$$bb.x_B = v.x_{n+1} \quad (62)$$

$$bb.y_B = v.y_{n+1} \quad (63)$$

$$bb.x_C = v.x_{n+1} + \left((norm.x_n + dir.x_n) * \frac{w}{2}\right) \quad (64)$$

$$bb.y_C = v.y_{n+1} + \left((norm.y_n + dir.y_n) * \frac{w}{2}\right) \quad (65)$$

$$bb.x_D = v.x_{n+1} + \left((norm.x_{n+1} - dir.x_{n+1}) * \frac{w}{2}\right) \quad (66)$$

$$bb.y_D = v.y_{n+1} + \left((norm.y_{n+1} - dir.y_{n+1}) * \frac{w}{2}\right) \quad (67)$$

$$bb.x_E = v.x_{n+1} + \left(norm.x_{n+1} * \frac{w}{2}\right) \quad (68)$$

$$bb.y_E = v.y_{n+1} + \left(norm.y_{n+1} * \frac{w}{2}\right) \quad (69)$$

$$bb.x_F = v.x_{n+1} - \left(norm.x_{n+1} * \frac{w}{2}\right) \quad (70)$$

$$bb.y_F = v.y_{n+1} - \left(norm.y_{n+1} * \frac{w}{2}\right) \quad (71)$$

for an angle α within the quadrant Q4 (FIG. 8).

In order to allow the rectangles 1 and 2, which are likewise displayed as a triangle sequence, together with the triangle sequence 6 filling the respective gap 5 to be represented and displayed more quickly, the invention provides that, following the display of the first rectangle 1 by means of the two triangles T1 and T2, a further triangle is represented and displayed by the corner points ACB. This results in the production of a connecting triangle 7 which forms the transition from the edge length of the rectangle 1 to the edge length of the triangle sequence 6, and which is only half as great as the edge length of the rectangle 1.

In the same way, following the display of the triangle sequence 6, a further connecting triangle 7 can be represented and displayed by the corner points BFG, once again forming the transition from the edge length of the triangle sequence 6 to the edge length of the second rectangle 2.

The use of connecting triangles 7 allows the successive rectangles 1, 2 and the triangle sequence 6 which is physically arranged between them to be calculated and displayed as a uniform sequence of triangles. Particularly when using the graphics programming language OpenGL, a particularly simple and quick display can be produced in this way.

Figure 9:
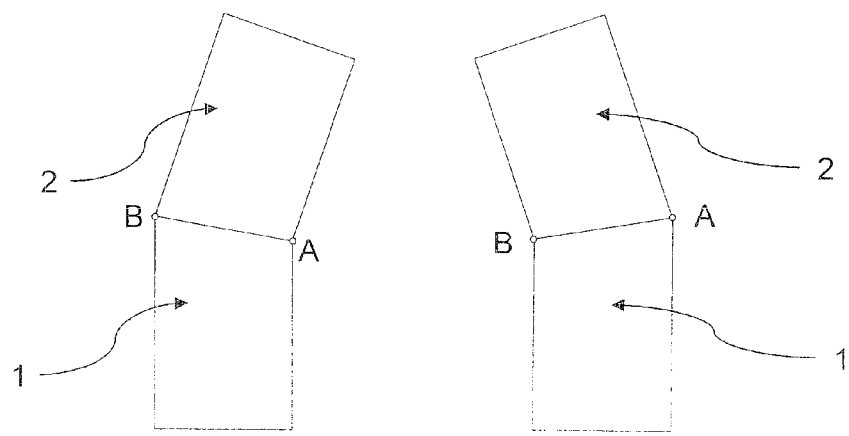
FIG. 9 shows a schematic illustration of two successive rectangles in each case, whose alignment changes only slightly to the right and to the left.

If the alignment of the successive rectangles 1 and 2 changes only slightly, with the relative direction change being an angle α which is less than a predetermined threshold value $α_0$ of, for example 20°, it is sufficient for most applications to match the mutually facing corner points of the rectangles 1 and 2. In this case, the two rectangles are in this case deformed, as shown in FIG. 9, to form polygons with two corresponding corner points A, B and a common side edge 8, whose boundary differs slightly from a rectangular shape and ensures a smooth transition between the two successive rectangles 1 and 2, and the resulting polygons. The respectively matching or common corner points A and B are defined to be:

$$bb.x_A = v.x_{n+1} + \left(bisec.x * \frac{w}{2*bisec.\cos}\right) \quad (72)$$

$$bb.y_A = v.y_{n+1} + \left(bisec.y * \frac{w}{2*bisec.\cos}\right) \quad (73)$$

$$bb.x_B = v.x_{n+1} - \left(bisec.x * \frac{w}{2*bisec.\cos}\right) \quad (74)$$

$$bb.y_B = v.y_{n+1} - \left(bisec.y * \frac{w}{2*bisec.\cos}\right). \quad (75)$$

For minor direction changes, there is no need to calculate and display a triangle sequence filling the gap 5, and this has no adverse effect on the perceptible display quality. If required, the threshold value $\alpha_0$ can be matched, as a function of the line width w, to the display being used or to the respectively predetermined graphics display quality requirements. In the same way, the boundary of the respective quadrants Q2 and Q3, as well as Q4 and Q5, can also be specifically adapted, in order to improve the display quality.

The rectangles 1, 2 and the respective triangle sequences 6 can be provided with shading, in order to improve the quality. For simplicity, for minor direction changes (quadrant Q1), the rectangular shading can be retained, and/or may be extended to the area of the mutually adjacent polygons.

Figure 10:
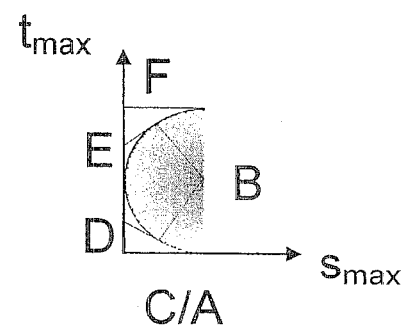
FIG. 10 shows a schematic illustration of a determined area of an end point shading element which can be superimposed on a previously displayed triangle sequence.

For clearly perceptible direction changes (quadrants Q2 to Q5), it is expediently possible to use a radially symmetrical shading element, and this is also used to display end areas of a line or of a continuous line. The following text is based on the assumption of a semicircular radially symmetrical shading element, and an end point shading element as shown in FIG. 10. The shading element coordinates are in a range between 0 and $s_{max}$ (shown here as the x axis) or between 0 and $t_{max}$ (shown here as the y axis). In order to allow the shading to correctly cover the triangle sequence 6, the relevant corner points BCDEF of the triangle sequence 6 must be associated with corresponding coordinates BCDEF of the shading element, and a shading area predetermined or bounded by these coordinates must be mapped onto the triangle sequence 6.

The respective shading coordinates can be calculated using:

$$bb \cdot t_A = (1 - bisec \cdot \cos) * t_{MAX} \quad (76)$$

$$bb \cdot s_A = (1 - (-bisec \cdot \sin)) * 0.5 * s_{MAX} \quad (77)$$

$$bb \cdot t_B = t_{MAX} \quad (78)$$

$$bb \cdot s_B = 0.5 * s_{MAX} \quad (79)$$

$$bb \cdot t_C = (1 - (-bisec \cdot \cos)) * t_{MAX} \quad (80)$$

$$bb \cdot s_C = (1 - (-bisec \cdot \sin)) * 0.5 * s_{MAX} \quad (81)$$

$$bb \cdot t_D = 0 \quad (82)$$

$$bb \cdot s_D = (1 - (-bisec \cdot \sin)) * 0.5 * s_{MAX} \quad (83)$$

$$bb \cdot t_E = 0 \quad (84)$$

$$bb \cdot s_E = s_{MAX} - ((1 - (-bisec \cdot \sin)) * 0.5 * s_{MAX}) \quad (85)$$

$$bb \cdot t_F = (1 - bisec \cdot \cos) * t_{MAX} \quad (86)$$

$$bb \cdot s_F = s_{MAX} - ((1 - (-bisec \cdot \sin)) * 0.5 * s_{MAX}) \quad (87)$$

for an angle $\alpha$ within the quadrant Q2, using $$bb \cdot t_A = (1 - bisec \cdot \cos) * t_{MAX} \quad (88)$$

$$bb \cdot s_A = 0 \quad (89)$$

$$bb \cdot t_B = t_{MAX} \quad (90)$$

$$bb \cdot s_B = 0.5 * s_{MAX} \quad (91)$$

$$bb \cdot t_C = (1 - bisec \cdot \cos) * t_{MAX} \quad (92)$$

$$bb \cdot s_C = 0 \quad (93)$$

$$bb \cdot t_D = 0 \quad (94)$$

$$bb \cdot s_D = 0 \quad (95)$$

$$bb \cdot t_E = 0 \quad (96)$$

$$bb \cdot s_E = s_{MAX} \quad (97)$$

$$bb \cdot t_F = t_{MAX} \quad (98)$$

$$bb \cdot s_F = s_{MAX} \quad (99)$$

for an angle $\alpha$ within the quadrant Q3, using $$bb \cdot t_A = (1 - bisec \cdot \cos) * t_{MAX} \quad (100)$$

$$bb \cdot s_A = 0 \quad (101)$$

$$bb \cdot t_B = t_{MAX} \quad (102)$$

$$bb \cdot s_B = 0.5 * s_{MAX} \quad (103)$$

$$bb \cdot t_C = (1 - bisec \cdot \cos) * t_{MAX} \quad (104)$$

$$bb \cdot s_C = 0 \quad (105)$$

$$bb \cdot t_D = 0 \quad (106)$$

$$bb \cdot s_C = 0 \quad (107)$$

$$bb \cdot t_E = 0 \quad (108)$$

$$bb \cdot s_E = s_{MAX} \quad (109)$$

$$bb \cdot t_F = t_{MAX} \quad (110)$$

$$bb \cdot s_F = s_{MAX} \quad (111)$$

for an angle $\alpha$ within the quadrant Q4, and using $$bb \cdot t_A = (1 - bisec \cdot \cos) * t_{MAX} \quad (112)$$

$$bb \cdot s_A = (1 - bisec \cdot \sin) * 0.5 * s_{MAX} \quad (113)$$

$$bb \cdot t_B = t_{MAX} \quad (114)$$

$$bb \cdot s_B = 0.5 * s_{MAX} \quad (115)$$

$$bb \cdot t_C = (1 - bisec \cdot \cos) * t_{MAX} \quad (116)$$

$$bb \cdot s_C = (1 - bisec \cdot \sin) * 0.5 * s_{MAX} \quad (117)$$

$$bb \cdot t_D = 0 \quad (118)$$

$$bb \cdot s_D = (1 - bisec \cdot \sin) * 0.5 * s_{MAX} \quad (119)$$

$$bb \cdot t_E = 0 \quad (120)$$

$$bb \cdot s_E = s_{MAX} - (1 - bisec \cdot \sin) * 0.5 * s_{MAX}) \quad (121)$$

$$bb \cdot t_F = (1 - bisec \cdot \cos) * t_{MAX} \quad (122)$$

$$bb \cdot s_F = s_{MAX} - ((1 - bisec \cdot \sin) * 0.5 * s_{MAX}) \quad (123)$$

for an angle $\alpha$ within the quadrant Q5.

What is claim is:

1. A method for displaying continuous lines on a raster-based display appliance, with a continuous line being defined by a sequence of two-dimensional support points and a line width, and with a rectangle, which connects the support points, having a rectangle length predetermined by the distance between the support points and having a rectangle width predetermined by the line width being displayed between two support points, and wherein an alignment angle a between two successive rectangles is determined and wherein a triangle sequence, which covers a gap between the rectangles is displayed between two successive rectangles when the alignment angle $\alpha \geqq$ a predetermined threshold angle ($\alpha_0$) and wherein the successive rectangles are deformed by matching mutually facing corner points to cover a gap between the successive rectangles when the alignment angle $\alpha < \alpha_0$.

2. A method according to claim 1, wherein the triangle sequence comprises a plurality of triangles which each have the support point v2, which connects the successive rectangles as a common corner point.

3. A method according to claim 1, wherein the triangle sequence has three triangles.

4. A method according to claim 2, wherein the triangle sequence has three triangles.

5. A method according to claim 2, wherein a connecting triangle is in each case displayed between the rectangle and the triangle sequence and between the triangle sequence and the subsequent rectangle, the corner points of which connecting triangle are the two corner points which face the triangle sequence of the rectangle, and of the subsequent rectangle and the connecting support point v2.

6. A method according to claim 2, wherein the corner points of the triangle sequence are predetermined as a function of the angle $\alpha$ between the alignment of the successive rectangles.

7. A method according to claim 1, wherein the triangle sequence is filled with shading.

8. A method according to claim 7, wherein the shading is a subarea of end point shading.

9. A method according to claim 8, wherein the shading is a circular segment of radially symmetrical end point shading.

10. A method according to claim 9, wherein the circular segment has a circular segment angle which corresponds to the alignment angle $\alpha$ between the alignment of the successive rectangles.

11. A method according to claim 1, wherein $\alpha_0$ is 20 degrees.

* * * * *